United States Patent [19]
Mooney et al.

[11] Patent Number: 5,946,033
[45] Date of Patent: Aug. 31, 1999

[54] METHOD AND APPARATUS FOR MULTIPLE READ-OUT SPEEDS FOR A CTD

[75] Inventors: Paul Edward Mooney, San Leandro, Calif.; Ondrej L. Krivanek, Royston; Niklas Dellby, Cambs, both of United Kingdom

[73] Assignee: Gatan, Inc., Pleasanton, Calif.

[21] Appl. No.: 08/654,398

[22] Filed: May 28, 1996

[51] Int. Cl.⁶ .................................................. H04N 3/14
[52] U.S. Cl. .......................................... 348/312; 348/322
[58] Field of Search ..................................... 348/311, 312, 348/294, 317, 322, 324

[56] References Cited

U.S. PATENT DOCUMENTS

| | | |
|---|---|---|
| 4,283,742 | 8/1981 | Izumita et al. . |
| 4,287,441 | 9/1981 | Smith . |
| 4,549,215 | 10/1985 | Levine . |
| 4,556,851 | 12/1985 | Levine . |
| 4,644,287 | 2/1987 | Levine . |
| 4,679,096 | 7/1987 | Nagashima ............................. 358/287 |
| 4,683,580 | 7/1987 | Matsunaga . |
| 4,689,808 | 8/1987 | Moorman et al. . |
| 4,716,317 | 12/1987 | Spierings . |
| 4,719,512 | 1/1988 | Endo et al. . |
| 4,845,382 | 7/1989 | Eouzan et al. . |
| 4,873,574 | 10/1989 | Darby . |
| 4,987,321 | 1/1991 | Toohey . |
| 5,065,029 | 11/1991 | Krivanek . |
| 5,086,344 | 2/1992 | D'Luna et al. . |
| 5,223,932 | 6/1993 | Thomas et al. . |
| 5,489,945 | 2/1996 | Kannegundla et al. ................ 348/521 |
| 5,541,651 | 7/1996 | Iura et al. ............................... 348/240 |
| 5,625,414 | 4/1997 | Manning ................................ 348/312 |

FOREIGN PATENT DOCUMENTS

| | | | |
|---|---|---|---|
| 63-200679 | 8/1988 | Japan ............................. H04N 5/335 |
| 63-250286 | 10/1988 | Japan ............................. H04N 5/225 |

*Primary Examiner*—Wendy Garber
*Assistant Examiner*—Jacqueline Wilson
*Attorney, Agent, or Firm*—Killworth, Gottman, Hagan & Schaeff, LLP

[57] ABSTRACT

A method and apparatus are provided for CTD imaging device multiple read-out speeds with optimized operation at all of the available speeds. Image signals from a CTD imaging device are digitally sampled at a defined frequency with the read-out electronics being matched to the defined frequency for optimum operation at that frequency. Digital samples taken during both a first (reset reference) portion of each image signal and a second (image voltage) portion of each image signal are then discarded if taken during a noisy/unstable part of the image signal or accumulated and averaged if taken during a stable part of the image signal. The accumulated and averaged digital samples are then algebraically combined to produce signals representative of an image generated by the CTD imaging device. The read-out speed of the CTD imaging device is a fraction of the sampling speed and can be selected by setting an integer divisor for the defined sampling frequency. Selected ones of the samples are retained based on the selected read-out speed. For the fastest read-out speed, the number of samples taken per imaging signal is one and the divisor is equal to one. Selected slower speeds determine which samples are discarded and which samples are accumulated, averaged and combined to produce signals representative of an image generated by the CTD imaging device.

3 Claims, 2 Drawing Sheets

METHOD AND APPARATUS FOR MULTIPLE READ-OUT SPEEDS FOR A CTD

BACKGROUND OF THE INVENTION

The present invention relates in general to processing image bearing signals read-out from an image sensing charge-transfer device (CTD) and, more particularly, to a method and apparatus which provides multiple read-out speeds for processing such image bearing signals. While the present invention is generally applicable to CTD's, it will be described herein with reference to an image sensing charge-coupled device (CCD) for which it is initially being used.

Image sensing charge-coupled devices (CCDs) are the most sensitive imaging devices currently available. CCDs also have a wide ratio between the strongest and weakest signals which they can capture, i.e., dynamic range, good sensitivity and can provide images at television rates. In view of these properties, CCDs are widely used in all areas of imaging technology.

In scientific imaging applications of CCDs, for example in a transmission electron microscope (TEM), to obtain the highest possible image quality, it is necessary to achieve the lowest possible signal noise and the widest possible dynamic range from an associated CCD. Reduced read-out noise and wide dynamic range can be obtained when CCD images are read out slowly and by means of a commonly used technique known as correlated double sampling. In essence, correlated double sampling subtracts a reset reference or "zero" voltage from an image voltage for each pixel of the CCD. Thus, for correlated double sampling, a new "zero" level is measured for the signal detected on each pixel of the CCD and subtracted from the signal level to substantially eliminate spurious contributions due to noise which is added to the signal level and the "zero" level in the same manner. Correlated double sampling is commonly performed using analog devices with the resulting correlated signal level then being digitized for further processing.

During operation of scientific imaging instruments, for example in TEMs during times when a specimen is being searched to identify an area which is to be investigated in greater detail, increasing the refresh rate of the image is more important than image quality to speed up the search process. In order to be able to obtain the best possible read-out noise performance at a given speed, all portions of the read-out circuitry need to be designed with a time constant matched to just the one given speed. Thus, with conventional correlated double sampling read-out circuitry, it is not possible to optimize the read-out operation for several different read-out speeds. In view of these limitations, currently available CCD imaging devices utilize circuitry which is either optimized for a single read-out speed or has more than one read-out speed serviced by multiple front ends of the read-out circuitry.

There is, thus, a need for an improved read-out arrangement which provides multiple read-out speeds for a CTD imaging device and optimizes the read-out operation for each available speed.

SUMMARY OF THE INVENTION

This need is met by the invention of the present application wherein a method and apparatus are provided for CTD imaging device multiple read-out speeds with optimized operation at all of the available speeds. Image signals from the CTD imaging device are digitally sampled at a defined frequency with the read-out electronics being matched to the defined frequency for optimum operation at that frequency. Digital samples taken during both a first (reset reference) portion of each image signal and a second (image voltage) portion of each image signal are then discarded if taken during a noisy/unstable part of the image signal or accumulated and averaged if taken during a stable part of the image signal. The accumulated and averaged digital samples are then algebraically combined to produce signals representative of an image generated by the CTD imaging device. The read-out speed of the CTD imaging device is a fraction of the sampling speed and can be selected by setting an integer divisor for the defined sampling frequency. Selected ones of the samples are retained based on the selected read-out speed. For the fastest read-out speed, the number of samples taken per imaging signal is one and the divisor is equal to one. Selected slower speeds determine which samples are discarded and which samples are accumulated, averaged and combined to produce signals representative of an image generated by the CTD imaging device.

In accordance with one aspect of the present invention, a method for providing multiple read-out speeds for image bearing signals from a charge transfer device comprises the steps of: generating a sampling clock signal having a defined frequency; generating a read-out clock signal for read-out of image bearing signals from a charge transfer device, the read-out clock signal having a frequency resulting from division of the defined frequency of the sampling clock by an integer divisor; reading-out image bearing signals from the charge transfer device in response to the read-out clock signal; digitally sampling the image bearing signals in response to the sampling clock signal to generate digital samples; processing the digital samples to produce signals representative of an image generated by the charge transfer device; and, selecting the divisor to determine the read-out speed of the image bearing signals. For the fastest read-out time without regard for noise, the step of selecting the divisor to determine read-out speeds for image bearing signals may comprise the step of selecting the divisor to be equal to one.

The image bearing signals comprise a series of pixel signals with each pixel signal comprising a first portion during which a reset reference voltage is present and a second portion during which an image voltage is present, and the step of processing the digital signals to produce signals representative of an image generated by the charge transfer device comprises the steps of: accumulating at least one digital reset sample during a stable portion of the first portion of each of the pixel signals; accumulating at least one digital image sample during a stable portion of the second portion of each of the pixel signals; determining an average of accumulated reset samples; determining an average of accumulated image samples; and, algebraically combining the average of accumulated reset samples with the average of accumulated image samples to produce signals representative of an image generated by the charge transfer device.

In accordance with another aspect of the present invention, a read-out control system for providing multiple read-out speeds for image bearing signals from a charge transfer device comprises a sample clock generator for generating a sampling clock signal having a defined frequency. A read-out clock generator generates a read-out clock signal for read-out of image bearing signals from a charge transfer device, the read-out clock signal having a frequency resulting from division of the defined frequency of the sampling clock signal by an integer divisor. Read-out circuitry is responsive to the read-out clock signal for reading-out image bearing signals from the charge transfer device. Digitizing circuitry is responsive to the sampling clock signal for digitally sampling the image bearing signals to generate digital samples. Processing circuitry combines the digital samples to produce signals representative of an image generated by the charge transfer device. Read-out speed selection circuitry selects the divisor to determine the read-out speed of the image bearing signals.

The image bearing signals comprise a series of pixel signals with each pixel signal comprising a first portion during which a reset reference voltage is present and a second portion during which an image voltage is present. The processing circuitry may comprise accumulator circuitry for accumulating at least one digital reset sample during a stable portion of the first portion of each of the pixel signals and at least one digital image sample during a stable portion of the second portion of each of the pixel signals. Averaging circuitry determines an average of accumulated reset samples and an average of accumulated image samples. Summer circuitry algebraically combines the average of accumulated reset samples with the average of accumulated image samples to produce signals representative of an image generated by the charge transfer device. The averaging circuitry may comprise a shifter circuit.

It is an object of the present invention to provide an improved read-out arrangement for a CTD imaging device which provides multiple read-out speeds while optimizing the read-out operation for each available speed; to provide an improved read-out arrangement for a CTD imaging device which digitizes image bearing signals at a defined frequency while reading out image bearing signals at a fraction of the defined frequency; and, to provide an improved read-out arrangement for a CTD imaging device which digitizes image bearing signals at a defined frequency while reading out image bearing signals at a fraction of the defined frequency with selected samples being accumulated, averaged and algebraically combined to produce signals representative of an image generated by the CTD imaging device.

Other objects and advantages of the invention will be apparent from the following description, the accompanying drawings and the appended claims.

DETAILED DESCRIPTION OF THE INVENTION

Figure 1:
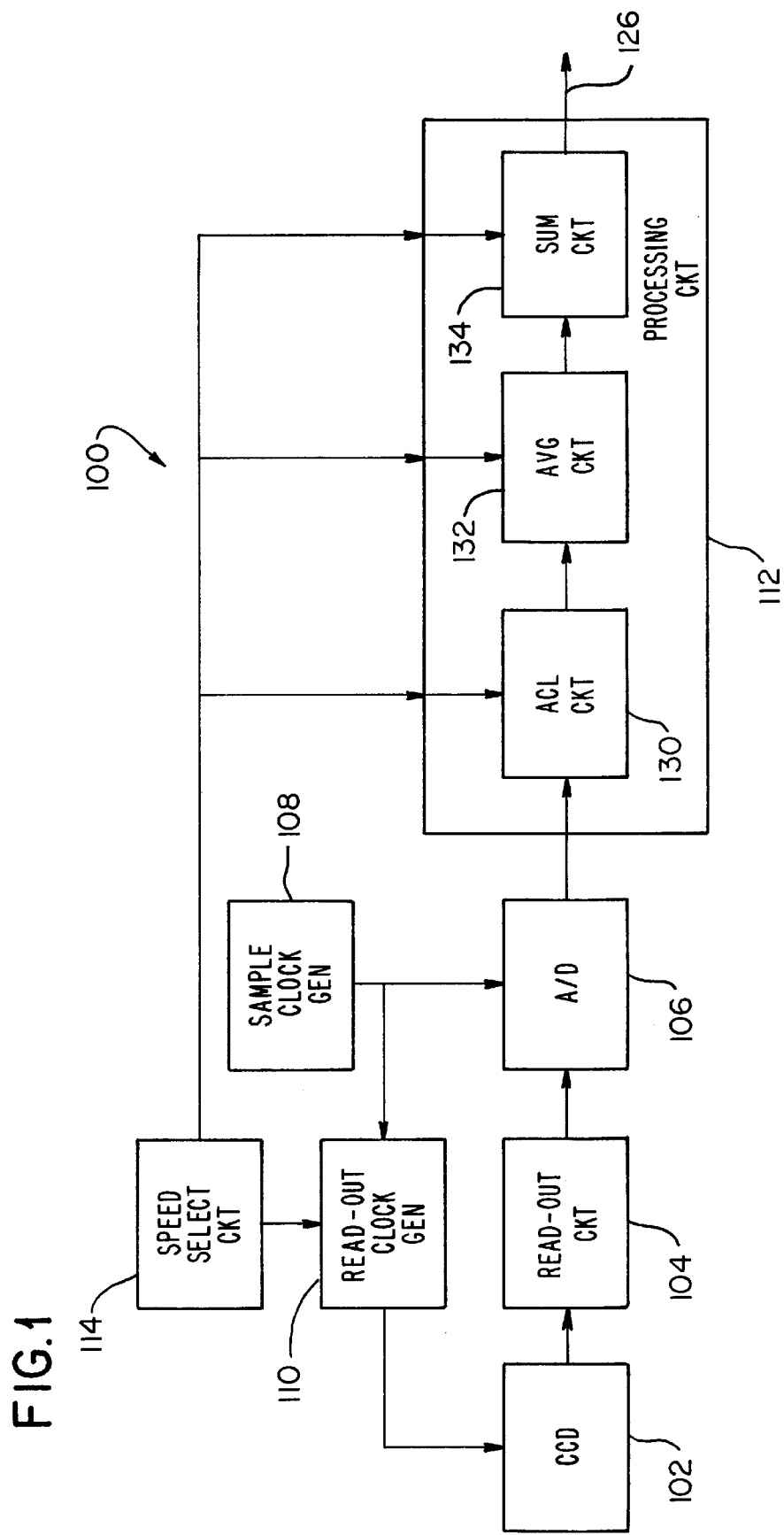
FIG. 1 is a schematic block diagram of apparatus including a read-out control system operable in accordance with the invention of the present application.

Reference will now be made to the schematic block diagram of FIG. 1 which illustrates a read-out control system 100 for providing multiple read-out speeds for image bearing signals produced from a charge coupled device (CCD) 102. The CCD 102 generates charge packets representative of an image sensed by the CCD 102 and corresponding to an array of individual picture elements or pixels. Read-out circuitry 104 generates image bearing signals from the charge packets in a conventional manner known in the art. The image bearing signals are sampled by digitizing circuitry comprising an analog-to-digital converter (A/D) 106 in the embodiment of FIG. 1 to generate digital samples of the image bearing signals.

A sample clock generator 108 generates a sampling clock signal having a defined frequency which is passed to the A/D 106 for controlling the operating speed of digitization or sampling of the image bearing signals. A read-out clock generator 110 generates a read-out clock signal for controlling the operating speed of the CCD 102. The read-out clock signal has a frequency which is a fraction of the frequency of the sampling clock signal.

To ensure synchronization of the read-out clock signal with the sample clock signal, the read-out clock signal is preferably derived from the sample clock signal. To that end, the read-out clock generator receives the sampling clock signal from the sample clock generator 108 and generates the read-out clock signal by division of the sampling clock signal by an integer divisor. Thus, the read-out clock generator may comprise divider circuitry.

Processing circuitry 112 receives the digital samples from the A/D 106 and combines them to produce signals representative of the image sensed by the CCD 102. Read-out speed selection circuitry 114 is coupled to the read-out clock 110 and the processing circuitry 112 for selecting the read-out speed of the image bearing signals from the CCD 102, for example, by selecting the divisor which is used to divide the sample clock signal from the sample clock generator 108 to derive the read-out clock signal.

Figure 2:
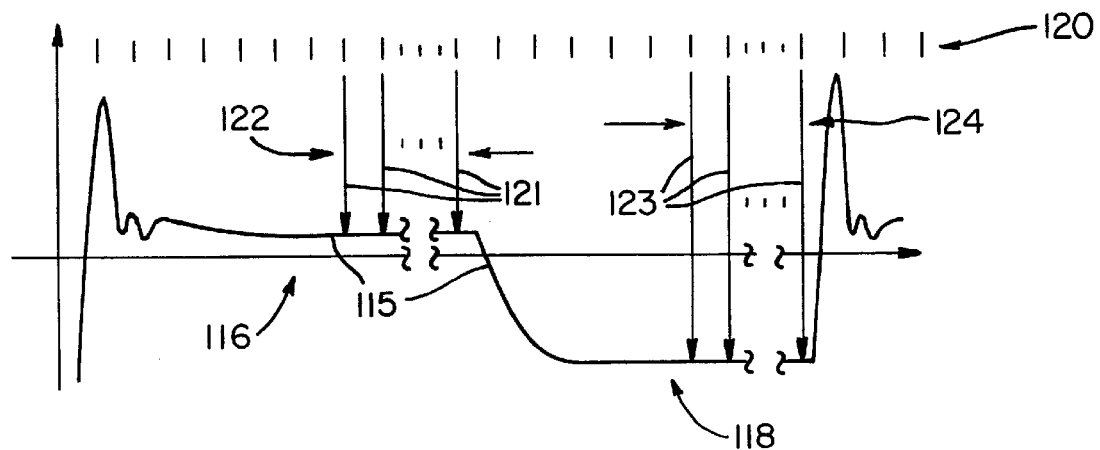
FIG. 2 is an ideal pixel read-out waveform illustrating operation of the read-out system of FIG. 1 at the slowest read-out speed.
Figure 3:
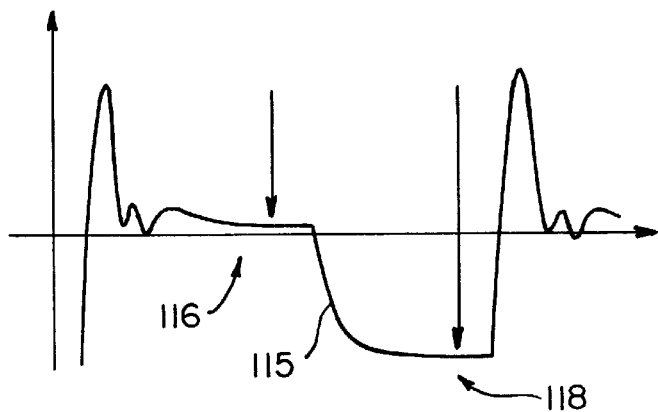
FIG. 3 is an ideal pixel read-out waveform illustrating operation of the read-out system of FIG. 1 at the fastest read-out speed consistent with correlated double sampling operation.
Figure 4:
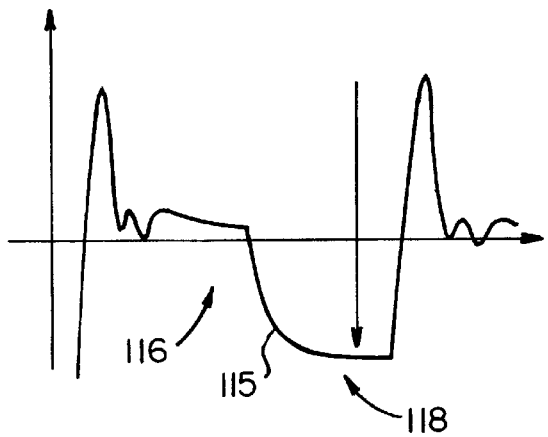
FIG. 4 is an ideal pixel read-out waveform illustrating operation of the read-out system of FIG. 1 at the fastest possible read-out speed without correlated double sampling operation.

The image bearing signals produced from the CCD 102 comprise a series of pixel signals. As illustrated in FIGS. 2–4 and in accordance with common CCD image signal read-out, each pixel signal 115 comprises a first portion 116 during which a reset reference voltage is present and a second portion 118 during which an image voltage is present. Sampling of the image signals as they are being read-out from the CCD 102 is performed at the defined frequency of the sampling clock signal generated by the sample clock generator 108. This fixed sampling is performed regardless of the speed of the read-out from the CCD 102.

Thus, as illustrated in FIG. 2, samples are taken at the defined frequency as indicated by the dashed sample lines 120. In accordance with the present invention, samples 121 taken during a stable subportion 122 of the first portion 116 of each pixel signal are summed and averaged by the processing circuitry 112. Similarly, samples 123 taken during a stable subportion 124 of the second portion 118 of each pixel signal are summed and averaged by the processing circuitry 112. The averages of the summed samples of the stable subportions 122, 124 of the first and second portions 116, 118 are then algebraically combined to perform a correlated double sampling read-out operation of the image bearing signals with resulting output signals appearing at an output 126 of the processing circuitry 112.

In accordance with the present invention, optimized read-out of image bearing signals from the CCD 102 is performed at a wide range of read-out speeds selected by the read-out speed selection circuitry 114. Optimization is assured by designing the read-out electronics to match and cater to the frequency of the sampling clock signal generated by the sample clock generator 108. Read-out speed is then adjusted with digital samples being taken at the defined sampling frequency throughout each pixel signal, such as the pixel signals 115 illustrated in FIGS. 2–4, regardless of the read-out speed. The processing circuitry 112 is then coordinated with the read-out speed to sum or accumulate and average the digital samples 121, 123 taken during the stable subportions 122, 124 of the first and second portions 116, 118.

As illustrated in FIG. 2, a very slow read-out speed is illustrated wherein a large number of digital samples, up to sixty four (64) in a working embodiment, are summed during each of the stable subportions 122, 124 of the first and second portions 116, 118. A much faster read-out speed is illustrated in FIG. 3 wherein only a single digital sample is taken during each of the stable subportions 122, 124 of the first and second portions 116, 118.

Accordingly, optimized read-out is possible at a range of speeds from one half the speed rating of the A/D 106 to approximately one hundred times slower. The dynamic range of the read-out process extends from the dynamic range of the A/D 106 at the highest read-out speed to the dynamic range of the A/D 106 at the highest read-out speed times the square root of one half the number of samples taken for each pixel at slower read-out speeds.

As illustrated in FIG. 4, the read-out control system 100 illustrated in FIG. 1 can also be used without sampling the reset reference voltage such that the read-out speed equals the speed rating of the A/D 106 and the divisor provided to the read-out clock 110 by the read-out speed selection circuitry 114 is equal to 1.

The processing circuitry 112 can range from discrete circuitry or an application specific integrated circuit (ASIC) to a processor which performs the identified tasks in software. However, it is currently preferred to utilize an ASIC with the processor circuitry comprising accumulator circuitry 130 for accumulating at least one digital reset sample during the stable portion 122 of the first portion 116 of each of the pixel signals and at least one digital image sample during the stable portion 124 of the second portion 118 of each of the pixel signals. Averaging circuitry 132 is provided for determining an average of accumulated reset samples and an average of accumulated image samples. The averaging circuitry 132 comprises shifter circuitry in a working embodiment of the present invention. Finally, summer circuitry 134 algebraically combines the average of the accumulated reset samples with the average of the accumulated image samples to produce signals representative of an image generated by the CCD 102 or other charge transfer device at the output 126 of the processing circuitry 112.

Having thus described the invention of the present application in detail and by reference to preferred embodiments thereof, it will be apparent that modifications and variations are possible without departing from the scope of the invention defined in the appended claims.

What is claimed is:

1. A method for providing multiple read-out speeds for image bearing signals from a charge transfer device comprising the steps of:

generating a sampling clock signal having a fixed frequency;

generating a read-out clock signal for read-out of image bearing signals form a charge transfer device, said read-cut clock signal having a frequency resulting from division of said fixed frequency of said sampling clock by an integer divisor;

reading-out said image bearing signals which comprise a series of pixel signals from said charge transfer device in response to said read-out clock signal, each pixel signal comprising a first portion during which a reset reference voltage is present and a second portion during which an image voltage is present;

digitally sampling said image bearing signals in response to said sampling clock signal to generate digital samples;

processing said digital samples to produce signals representative of an image generated by said charge transfer device by performing the steps of:

accumulating at least one digital reset sample during a stable portion of said first portion of each of said pixel signals;

accumulating at least one digital image sample during a stable portion of said second portion of each of said pixel signals;

determining an average of accumulated reset samples;

determining an average of accumulated image samples; and algebraically combining said average of accumulated reset samples with said average of accumulated image samples to produce signals representative of an image generated by said charge transfer devices; and selecting said divisor to determine the read-our speed of said image bearing signals.

2. A read-out control system for providing multiple read-out speeds for image bearing signals from a charge transfer device comprising:

a sample clock generator for generating a sampling clock signal having a fixed frequency;

a read-out clock generator for generating a read-out clock signal for read-out of image bearing signals from a charge transfer device, said read-out clock signal having a frequency resulting from division of said fixed frequency of said sampling clock signal by an integer divisor:

read-out circuitry responsive to said read-out clock signal for reading-out said image bearing signals which comprise a series of pixel signals from said charge transfer device in response to said read-out clock signal, each pixel signal comprising a first portion during which a reset reference voltage is present and a second portion during which an image voltage is present;

digitizing circuitry responsive to said sampling clock signal for digitally sampling said image bearing signals to generate digital samples:

processing circuitry for combining said digital samples to produce signals representative of an image generated by said charge transfer device, said processing circuitry comprising:

accumulator circuitry for accumulating at least one digital reset sample during a stable portion of said first portion of each of said pixel signals and at least one digital image sample during a stable portion of said second portion of each of said pixel signals;

averaging circuitry for determining an average of accumulated reset samples and an average of accumulated image samples; and summer circuitry for algebraically combining said average of accumulated reset samples with said average of accumulated image samples to produce signals representative of an image generated by said charge transfer device; and read-out speed selection circuitry for serving said divisor to determine the read-out speed of said image bearing signals.

3. A read-out control system for providing multiple read-out speeds for image bearing signals from a charge transfer device as claimed in claim 2 wherein said averaging circuitry comprises a shifter circuit.

* * * * *

UNITED STATES PATENT AND TRADEMARK OFFICE
CERTIFICATE OF CORRECTION

PATENT NO. : 5,946,033
DATED : August 31, 1999
INVENTOR(S) : Paul Edward Mooney et al.

It is certified that error appears in the above-identified patent and that said Letters Patent is hereby corrected as shown below:

Col. 6, claim 1, line 15, "read-our speed" should read -- read-out speed --.
Col. 6, claim 2, line 39, "digital samples:" should read -- digital samples; --.
Col. 6, claim 2, line 59, "for serving said" should read -- for selecting said --.

Signed and Sealed this

Twenty-third Day of May, 2000

Attest:

Q. TODD DICKINSON

*Attesting Officer*        *Director of Patents and Trademarks*